A. S. TANNER.
BLOCK MOLD.
APPLICATION FILED SEPT. 25, 1916.
1,235,858.
Patented Aug. 7, 1917.
2 SHEETS—SHEET 1.
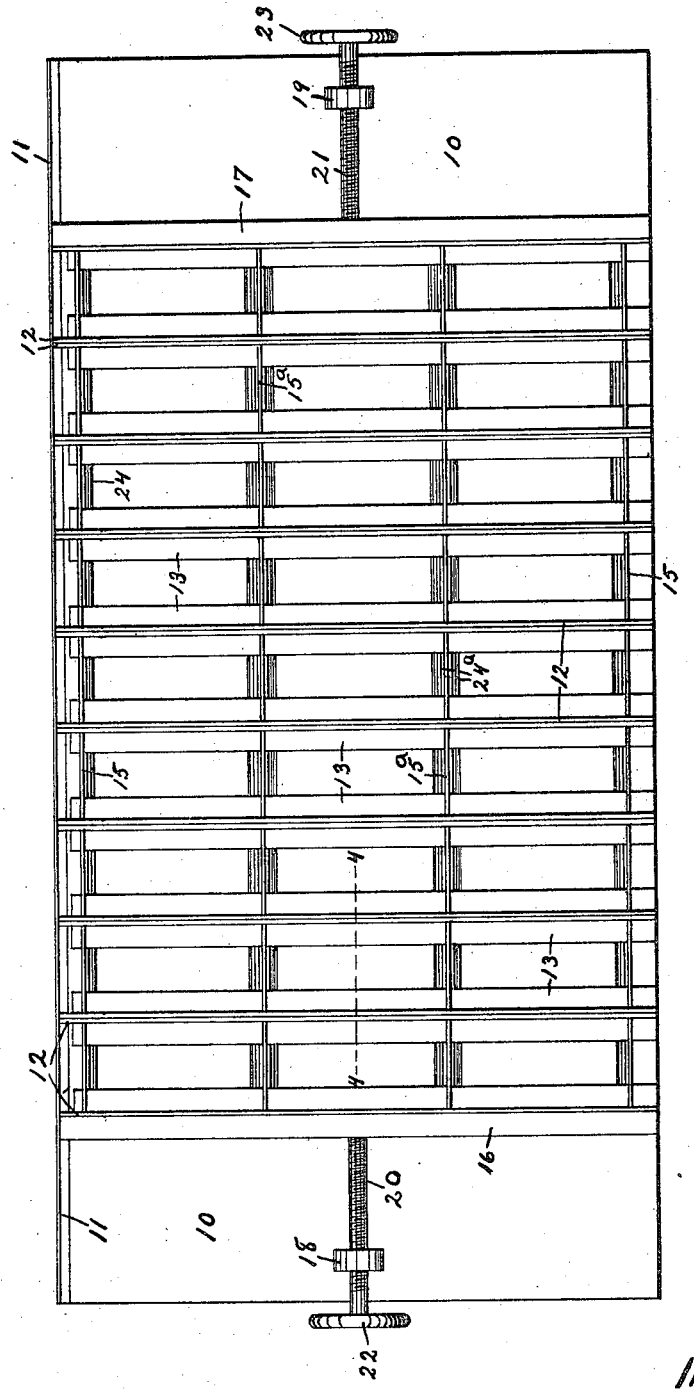
INVENTOR:
A. S. TANNER
By Earl M. Sinclair
Att'y.

A. S. TANNER.
BLOCK MOLD.
APPLICATION FILED SEPT. 25, 1916.
1,235,858.
Patented Aug. 7, 1917.
2 SHEETS—SHEET 2.
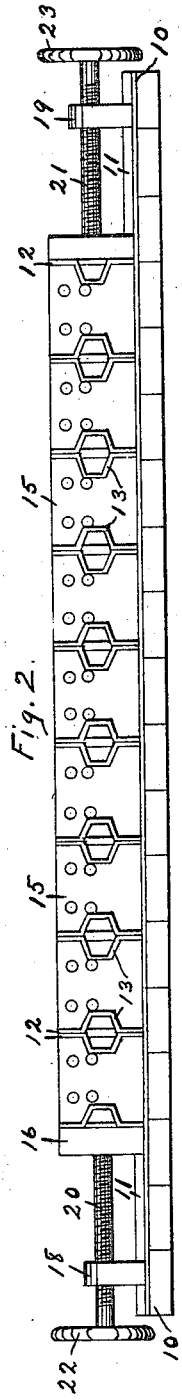
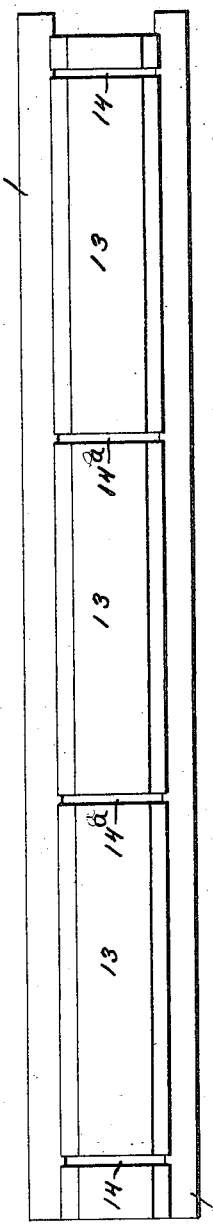
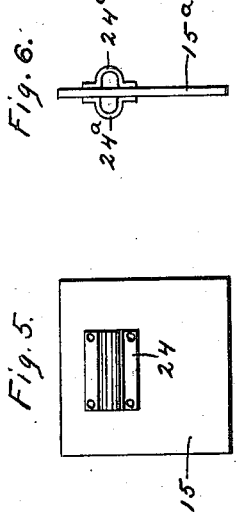
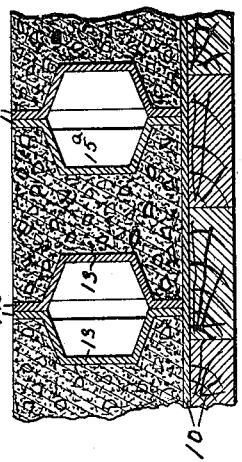
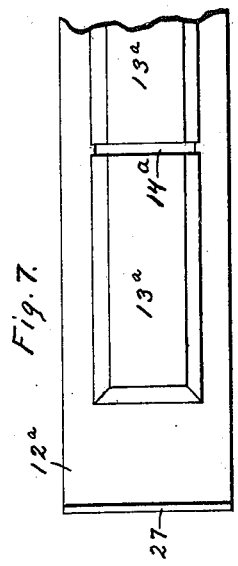
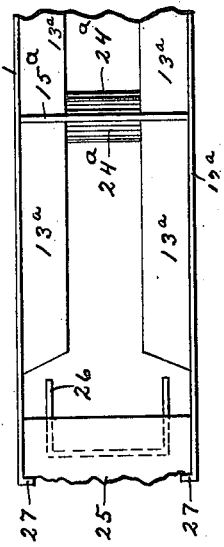
INVENTOR:
A. S. TANNER
By Earl M. Sinclair
Atty.

UNITED STATES PATENT OFFICE.

ALBERT S. TANNER, OF MASON CITY, IOWA.

BLOCK-MOLD.

1,235,858.

Specification of Letters Patent.

Patented Aug. 7, 1917.

Application filed September 25, 1916. Serial No. 121,957.

*To all whom it may concern:*

Be it known that I, ALBERT S. TANNER, citizen of the United States of America, and resident of Mason City, Cerro Gordo county, Iowa, have invented a new and useful Block-Mold, of which the following is a specification.

The object of this invention is to provide an improved construction for block molds of the sectional or knock-down type.

A further object of this invention is to provide an improved construction for block molds adapted to be assembled in any desired number on a stationary platform or base plate.

A further object of this invention is to provide improved means for mounting and holding the members of a mold relative to one another.

A further object of this invention is to simplify the construction of a sectional mold, and reduce the number of pieces comprising the assembly.

A further object of this invention is to provide improved means for drawing the members of the mold together in compact relation.

My invention consists in the construction, arrangement and combination of elements hereinafter set forth, pointed out in my claims and illustrated by the accompanying drawing, in which—

Figure 1 is a plan showing a series of my improved molds assembled in position for practical use. Fig. 2 is a side elevation of the same. Fig. 3 is an inner face view of one of the side mold members employed in the device. Fig. 4 is a cross-section on the line 4—4 of Fig. 1. Fig. 5 is an inner face view and Fig. 6 an edge view of an end plate employed in the device. Fig. 7 is an inner face view of a portion of a special side mold member employed for molding corner blocks. Fig. 8 is an edge view of the same, showing also a special face molding device for the end of the corner block.

In the construction of the device as shown the numeral 10 designates a stationary or movable platform which preferably is built up of planking overlaid by a thin sheet of metal suitably secured thereto. A guide or straightedge 11, preferably formed of angle iron, is mounted on and fixed to the platform or base plate 10 and extends parallel with and adjacent to one of the sides thereof. A series of the molds are designed to be mounted loosely on the platform or base plate 10 in any desired and suitable number, said platform or base plate forming the bottoms of the molds. A plurality of side mold members 12 are provided, said side members being preferably formed of sheet metal and provided with the inwardly projecting core members 13 integrally formed thereon and extending substantially the full length thereof except as hereinafter provided. The side mold members 12 are adapted to extend transversely of the platform or base plate 10 and have one of their ends contacting and positioned by the guide 11. The side members 12 for each mold or row of molds are spaced apart a distance equal to the width of the block to be formed, with their core members directed inwardly toward one another as shown particularly in Fig. 4, said core members preferably being substantially trapezoidal in cross-section and centrally located on each mold member, whereby to form a block substantially I-shaped in cross-section. The side mold members may be of any desired length to form a row consisting of the desired number of mold compartments transversely of the platform 10, and in practice I have found it to be convenient to make said side members of such length as to form three mold compartments, as the operator can conveniently reach across and attend to an assembly of such dimension.

Each mold member 12 is formed with spaced slots 14 extending across its core member 13 and entirely to the base of said core member, or to the plane of the face of the mold member. Separate slots 14 are formed adjacent the end of each such member 12 and are adapted to receive endgates 15, and other slots 14ª are formed intermediate of the end slots and spaced apart and from said end slots distances corresponding to the length of the blocks to be molded. Endgates 15 are provided in numbers, and one of them is designed to form the end of each mold series, being inserted slidingly and by vertical movement in registering end slots 14 of the side members of each mold or row of mold compartments. Partition gates 15ª are provided in numbers and one of them is designed to form a partition between adjacent ends of mold compartments in a series, being inserted slidingly and by vertical movement in registering intermediate slots 14ª of the side members 12 of each mold or row of mold compartments. The endgates 15 and partition gates 15ª are preferably formed of sheet metal and are of substantially the same dimensions as the cross-section of the block to be formed, except that they are rectangular and do not conform to the contours of the block to be formed.

To facilitate removal of the molded blocks, I have found it convenient to provide horizontal grooves in each end of the web of the block, which grooves are formed by transverse lugs 24 on the inner faces of the endgates 15 and transverse lugs 24ª on both faces of the partition gates 15ª, said lugs being of a length corresponding to the width of the web of the block to be formed, and located preferably at the upper end of said web as the block rests in the mold. The grooves thus formed at each end of the block makes it convenient to carry away the partially hardened block manually without any support such as is often provided by the pallet. The groove so formed in the web at each end of the block also provides a convenient handhold when a workman is engaged in laying the blocks to form a wall, as it provides a space for the hand of the workman, between the block being handled and an adjacent block already placed. The grooves may, of course, be made of any suitable width, to afford sufficient room for a man's hand so that he can hold the block until it is placed in the proper position in the wall.

Any desired number of units composed of two side mold members 12, with their complement of endgates 15, and partition gates 15ª may be mounted in successive contact on the platform 10 and lined against the guide 11; to form any desired number of parallel rows of mold compartments, nine of such rows here being shown, thereby forming twenty-seven mold compartments in the assembly. Adjacent members 12 of contiguous units or rows of mold compartments contact back to back without interposed braces or strips.

Frame pieces or cross-heads 16, 17 are mounted outside of and in contact with the backs of the outermost side mold members 12, said frame pieces preferably being formed of pieces of planking of the same length and width as said side members. Uprights 18, 19 are fixed to and rise from central locations adjacent the ends of the platform 10, and screws 20, 21 are threaded through said uprights, said screws being provided at their outer ends with hand wheels 22, 23 or other means for manual operation. The inner ends of the screws 20, 21 are adapted to engage and exert pressure on the frame pieces 16, 17, to the end of drawing the mold members snugly and compactly together and making all of the mold compartments of uniform width.

In practical use, the mold members are assembled as shown and described, and, the mold compartments being open at their tops, wet or slushy concrete mixture is poured into said compartments, flowing beneath and filling the spaces beneath the core members 13, and entirely filling each mold compartment without voids. The mold members are securely held in position by the screws 20, 21, until the blocks have set to a certain extent, twenty-four hours usually being sufficient. Then the screws 20, 21 are released, the mold members 12, endgates 15 and partition gates 15ª are removed *seriatim*, and the partially hardened blocks are removed and carried away for further hardening and curing. No pallets are necessary, as the platform 10 forms the bottom for all of the molds, but pallets may be employed if desired.

A large number of blocks may be molded at one time with this device, as the mold compartments may be supplied to any desired extent, limited only by the size of the platform 10. Some of the blocks in the mold assembly may be ready for removal before those in another distant portion of the assembly, and in that case a portion of the assembly may be taken down and the blocks removed, and the molds set up again and refilled before such other portion of the assembly is disturbed. The use of a slushy or thoroughly wet concrete mixture insures a thorough wetting of all component parts of the mixture, a lack of voids, and a thorough setting of the blocks, so that the blocks formed are waterproof and not crumbly, and last much longer than those formed of an imperfectly moistened mixture.

The blocks are molded face up, and may be finished in any desired fashion. I have found that a very effective rock-face imitation face may be formed by making a number of depressions in the slushy face of the block immediately after molding, then laying a flat piece of steel wet on its under side on the face of the block and lifting quickly, whereby suction produces a great variety of roughened surfaces closely resembling chipped rock or stone.

To mold a corner block, finished on its upper face and at one end, a special form of side mold member 12ª is employed, shown in Figs. 7 and 8. In this construction the core member 13ª does not extend entirely to the end of the mold member, but terminates in a beveled end corresponding to the bevel of the sides of the core member. A thin slab 25 is molded, of the same cross-sectional area as the end gates 15, and to the inner face of this slab is imparted a rock-face or other desired finish in a suitable way. When the slab 25 is molded a reinforcing wire such as 26 is embedded in the plastic material thereof transversely, with its end portions protruding at the rear side of the slab. Then the slab, when hardened, is mounted in the end of the mold compartment formed of the special side members 12ª, with its finished face outermost, and forming the end of the mold compartment, the ends of the reinforcing or tie wire 26 projecting within the mold. Then a block is molded in the compartment against the slab 25 and around the projecting ends of the reinforcing and tie wire 26, whereby the molded block when hardened is tied to the slab 25, which thus provides a finished face at the end of the block and adapts it to use on corners and the like. The slab 25 may be held in place between the side mold members 12ª by vertically arranged strips or flanges 27 at the ends of said mold members.

I claim as my invention—

1. A multimolding concrete block assembly, comprising a platform, a guide fixed to and rising from one margin only of said platform, a plurality of molds or series of mold compartments arranged in parallel relations and contacting successively back to back loosely on said platform and contacting at one end each with said guide; cross-heads mounted loosely parallel with each other outside of the assembly of molds and abutting the guide at one end, uprights located in opposition to each other centrally of the width of and rising from the platform and spaced from the cross-heads on the sides thereof distant from the collocation of molds, and screws mounted in alinement with each other in said uprights and adapted to engage said cross-heads, each of the molds comprising side members having integral offset longitudinal core members, said core members being formed with registering slots adjacent their ends and also being formed with registering intermediate slots spaced from each other and from the end slots, endgates removably and replaceably mounted in registering end slots of the core members and partition gates removably and replaceably mounted in registering intermediate slots, each of said endgates being formed with a laterally extending lug centrally of one face thereof, each of said partition gates being formed with a laterally extending lug centrally of each face thereof, said side plates, endgates and partition gates being of uniform width and having their upper margins in a common plane.

2. In a multimolding concrete block assembly, a unit susceptible of indefinite multiplication, which unit comprises two side plates having their central portions offset toward each other integrally to form core members, said core members being formed with registering transverse end slots, said core members also being formed with registering transverse intermediate slots spaced from each other and from the end slots, endgates removably and replaceably mounted in said end slots and partition gates removably and replaceably mounted in said intermediatee slots, ecah of said endgates being formed with a lug projecting from one face thereof, each of said partition gates being formed with a lug projecting from each face thereof, each of said lugs being spaced from the margins of its respective plate, said side plates, endgates and partition gates having their upper margins in a common plane.

Signed by me at Mason City, Iowa, this 13th day of September, 1916.

ALBERT S. TANNER.

Copies of this patent may be obtained for five cents each, by addressing the "Commissioner of Patents, Washington, D. C."